United States Patent
McAfee et al.

(10) Patent No.: US 11,286,011 B2
(45) Date of Patent: Mar. 29, 2022

(54) ACTIVE AERO PANEL

(71) Applicant: Magna Exteriors Inc., Concord (CA)

(72) Inventors: Michael McAfee, Rochester Hills, MI (US); Martin R. Matthews, Troy, MI (US); Braendon R. Lindberg, Oxford, MI (US)

(73) Assignee: Magna Exteriors Inc., Concord (CA)

( * ) Notice: Subject to any disclaimer, the term of this patent is extended or adjusted under 35 U.S.C. 154(b) by 70 days.

(21) Appl. No.: 16/444,695

(22) Filed: Jun. 18, 2019

(65) Prior Publication Data

US 2019/0382063 A1 Dec. 19, 2019

Related U.S. Application Data

(60) Provisional application No. 62/686,271, filed on Jun. 18, 2018.

(51) Int. Cl.
| | |
|---|---|
| *B62D 37/02* | (2006.01) |
| *B60J 10/72* | (2016.01) |
| *B60J 10/767* | (2016.01) |
| *B60J 1/20* | (2006.01) |
| *B62D 35/00* | (2006.01) |

(52) U.S. Cl.
CPC .......... *B62D 37/02* (2013.01); *B60J 1/20* (2013.01); *B60J 10/72* (2016.02); *B60J 10/767* (2016.02); *B62D 35/005* (2013.01); *B62D 35/008* (2013.01)

(58) Field of Classification Search
USPC .................. 296/180.1, 180.5, 181.5
See application file for complete search history.

(56) References Cited

U.S. PATENT DOCUMENTS

| | | | | |
|---|---|---|---|---|
| 5,074,612 A | * | 12/1991 | Liese | B62D 35/007 296/180.5 |
| 5,141,281 A | * | 8/1992 | Eger | B62D 35/007 296/180.5 |
| 9,327,775 B1 | * | 5/2016 | Guenzel | B62D 35/008 |
| 10,099,730 B1 | * | 10/2018 | Williams | B62D 35/007 |
| 2007/0228771 A1 | * | 10/2007 | Froeschle | B62D 35/007 296/180.1 |
| 2016/0159412 A1 | * | 6/2016 | Oxley | B62D 35/007 296/180.5 |
| 2016/0318560 A1 | * | 11/2016 | Kishima | B60Q 1/0017 |

FOREIGN PATENT DOCUMENTS

| | | | | |
|---|---|---|---|---|
| DE | 2008011179 | * | 8/2009 | ............ B62D 37/02 |
| FR | 2854861 A1 | * | 11/2004 | ........... B62D 35/007 |
| FR | 2892994 | * | 5/2005 | ............ B62D 37/02 |
| FR | 2896759 A1 | * | 8/2007 | ........... B62D 35/007 |
| JP | H08216937 A | | 8/1996 | |
| JP | 2007030549 A | | 2/2007 | |
| JP | 2017052338 A | | 3/2017 | |
| WO | 2015/191697 A2 | | 12/2015 | |

OTHER PUBLICATIONS

Machine Translation of cited FR 2896759 (Pascal).*
Machine Translation of cited FR 2854861 (Aider).*
Machine Translation of previously cited DE 2008011179 (Tyler).*
International Search Report from PCT/US2019/037785 dated Oct. 3, 2019.

* cited by examiner

*Primary Examiner* — D Glenn Dayoan
*Assistant Examiner* — Kevin P Weldon
(74) *Attorney, Agent, or Firm* — Warn Partners, P.C.

(57) ABSTRACT

An active aero panel assembly including at least one deployable panel, at least one drive mechanism, and at least one actuator. The active aero panel assembly improves aerodynamics.

11 Claims, 4 Drawing Sheets

ACTIVE AERO PANEL

CROSS-REFERENCE TO RELATED APPLICATIONS

This application claims the benefit of U.S. Provisional Application No. 62/686,271, filed Jun. 18, 2018. The disclosure of the above application is incorporated herein by reference.

FIELD OF THE INVENTION

The present invention relates to an active panel system for automotive applications.

BACKGROUND OF THE INVENTION

There is a considerable loss of aerodynamic efficiency in vehicles, in particular, due to the air flow and drag around a vehicle. On particular area as toward the rear corner of the vehicle. Conventional structures, such as fixed panels are known and do not meet desired requirements. Another area is toward the rear cross car spoiler of the vehicle.

There is also a considerable loss of aerodynamic efficiency in vehicles due to the airflow underneath and near the wheels. Conventional structures, such as fixed panels or fixed air deflectors/dams using flexible materials, are known and do not meet desired requirements, including, but not limited to, conventional structures do not provide an effective sealed and clutchable actuator with communication capability and life cycle durability, a system that is capable of object detection, or a system that is durable and aerodynamically effective. These fixed air deflector/dams are still a compromise as they cannot be made to the optimum height without compromising specifications and compromising to other vehicle capabilities. Further, these air dams even when flexible are still damaged during off-roading or when added ground clearance is needed. Further, these dams do not offer active wheel spats or combination of deflective panel and wheel spats selectively deployed individually or together, when desired.

Accordingly, there is a desire for an active aero panel that provides an aerodynamic surface for improved aerodynamic when deployed, but is retractable out of the way under predetermined conditions to return the vehicle to its initial design intent.

SUMMARY OF THE INVENTION

There is provided an aerodynamic surface which improves aerodynamics when deployed and is retractable out of the way to return the vehicle to its initial design intent.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 9:
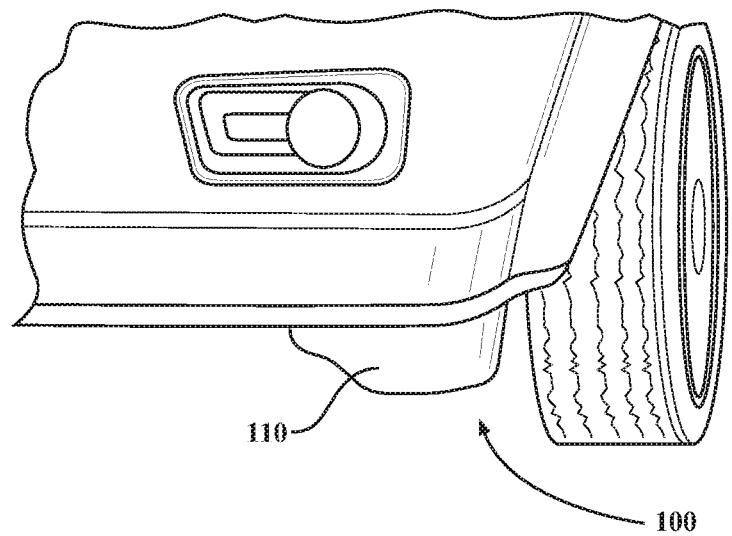
FIG. 9, is a perspective view of an active wheel spat, in accordance with the present invention.
Figure 10:
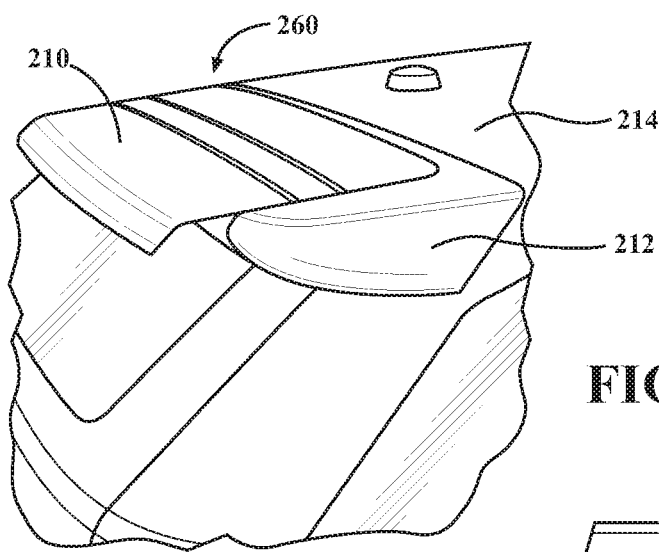
FIG. 10 is a perspective view of an active liftgate spoiler, in accordance with the present invention.
Figure 11:
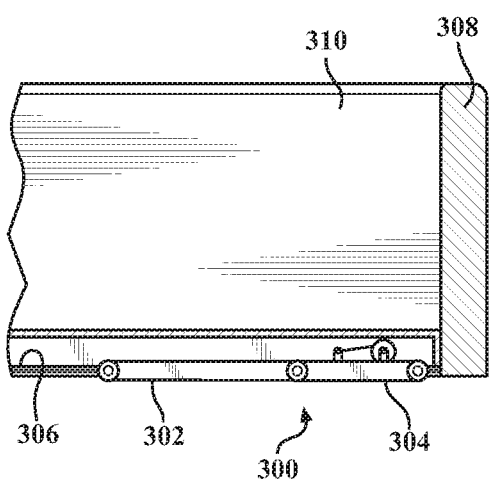
FIGS. 11-13 are an active airfoil incorporating pivoting panel actuation.
Figure 12:
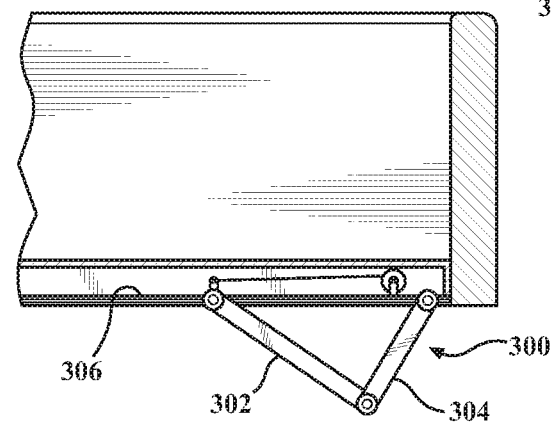
Figure 13:
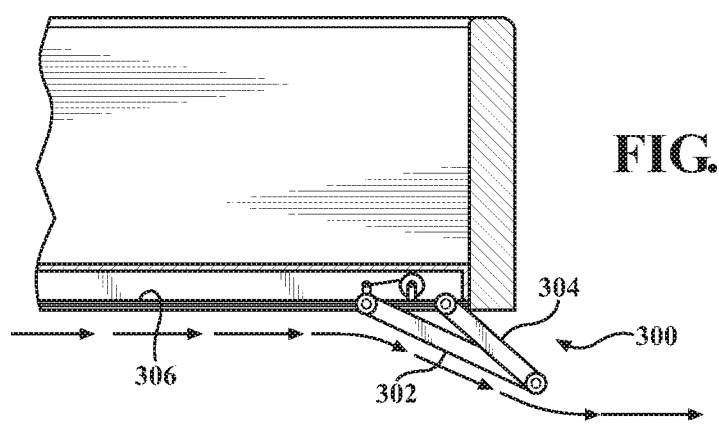

Referring to FIGS. 1-13 generally, there are depicted active aero assemblies for improved aerodynamics. Referring more particularly to FIGS. 1-8 generally, there are depicted rear active aero assemblies for improved aerodynamics. Referring to FIG. 9 generally, there is depicted at least one front active aero assembly for improved aerodynamics, preferably, an active front deflector assembly, most preferably, an active wheel spat assembly adjacent each front wheel. Referring to FIG. 10 generally, there is depicted a rear active aero assembly for improved aerodynamics, preferably, an active spoiler toward the rear of any vehicle, most preferably, an active liftgate spoiler. Referring to FIGS. 11-13 generally, there is depicted pivoting panel actuation for improved aerodynamics.

Operable actuators and kinematics are incorporated with FIGS. 1-13, depending on the particular application without departure from the scope of the present invention.

The assemblies of FIGS. 1-13 each incorporate at least one operable actuator.

Preferably, the assemblies of FIGS. 1-13 each incorporate at least one operable drive mechanism.

At least one suitable actuator 15 for deployment/stowage of the assemblies of FIGS. 1-13 is incorporated. By way of non-limiting example, the actuator is a rotary actuator, preferably, a rotary clutched actuator. However, any kind of actuator is contemplated suitable for rotating and/or sliding the aero panel depending on the application without departure from the scope of the present invention. The actuator can include/be an actuator with feedback options, hex-type, screw-type drive, higher speed actuator, electric, mechanical, linear, e.g., with current override circuits, declutching, hydraulic, pneumatic, extending, power lift actuator, rotary, or any other actuators and combinations thereof depending on the application and predetermined vehicle needs. An exemplary actuator for incorporation into the present invention is set forth in U.S. 2016/0230820, which is incorporated herein in its entirety by reference as part of the specification.

Referring to FIGS. 1-8, the assemblies are operable incorporated with the vehicle, e.g., such as including, but not limited to, attaching to the liftgate, integrated with the D-pillar, integrated with the liftgate, integrated with the rear quarter window, integrated with the rear quarter window D-pillar trim, etc. and/or any combinations thereof.

Figure 1:
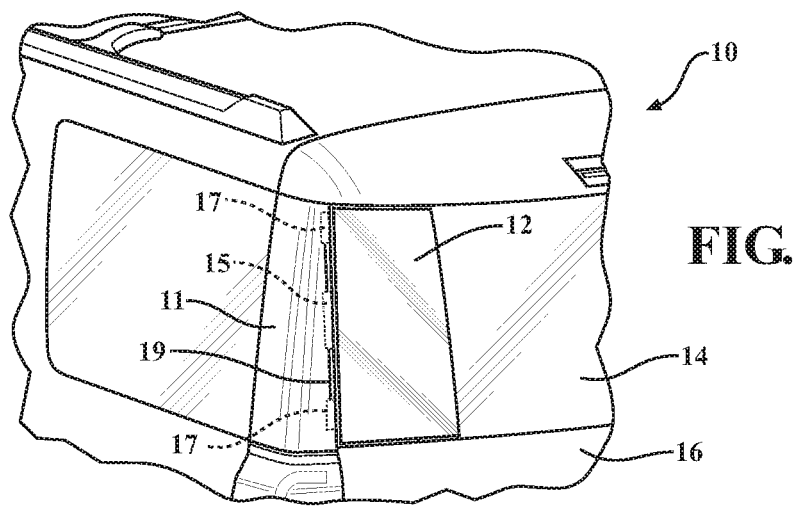
FIG. 1, is a perspective view of an airfoil incorporated with a liftgate, in accordance with the present invention.
Figure 2:
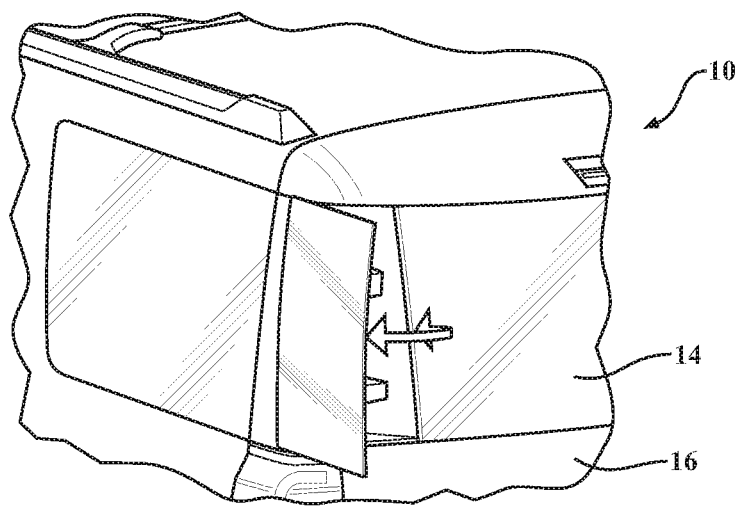
FIG. 2, is a perspective view of the airfoil of FIG. 1 incorporated with the liftgate, said airfoil in a stowed/closed position, in accordance with the present invention.

Referring to the figures generally, and more particularly to FIGS. 1-2, there is illustrated an active aero assembly shown generally at 10 including at least one panel 12 that is preferably generally vertically arranged near the rear corner 11 of the vehicle. Most preferably, the assembly 10 is incorporated into the liftgate 16 of the vehicle. When in the stowed/closed position, under predetermined conditions, the panel 12 is substantially seated with the edge of the rear window 14.

When in the deployed/open position, under predetermined conditions, the panel 12 is rotated, as indicated by arrow A (or otherwise moved, e.g., slid and/or rotated) a predetermined amount to improve aerodynamics. The deployed panel 12 is substantially vertical, or is angled. Generally, the deployed panel 12 is 0 to 90°, typically 10-85°, preferably, 15-80°. However, any other suitable angle is contemplated without departure from the scope of the present invention depending on the application. Any suitable deployment mechanism is contemplated depending on the particular application. FIG. 1 depicts at least one hinge, preferably, at least two hinges, and an operable drive mechanism 19 operably coupled to the actuator 15 to rotate the panel 12 open/closed. By way of non-limiting example, the hinge is any suitable pivot pin arrangement.

The assembly 10 is operably coupled with the vehicle D-pillar and rotates generally out, e.g., by pivot pin/door hinge points and actuator. Alternatively, the assembly 10 is operably incorporated with the liftgate.

Figure 3:
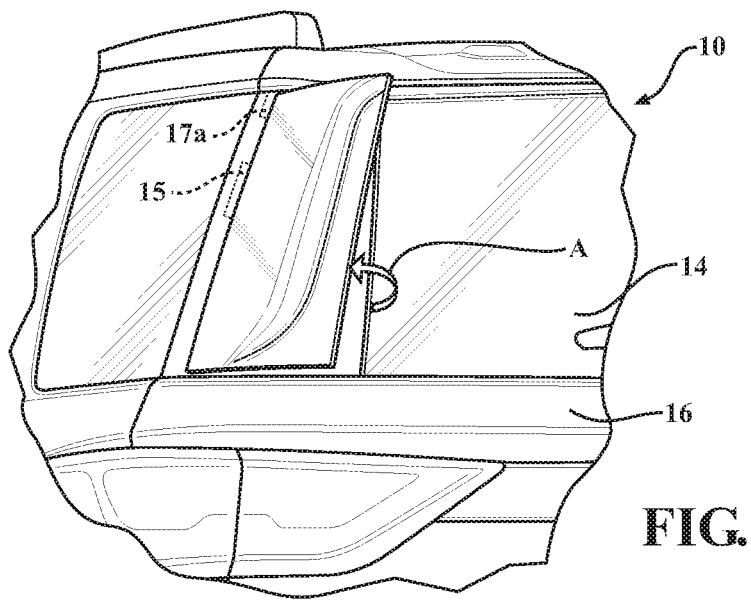
FIG. 3, is a perspective view of an airfoil incorporated with the liftgate, said airfoil in a deployed/open and angled position for improved aerodynamics, in accordance with the present invention.
Figure 4:
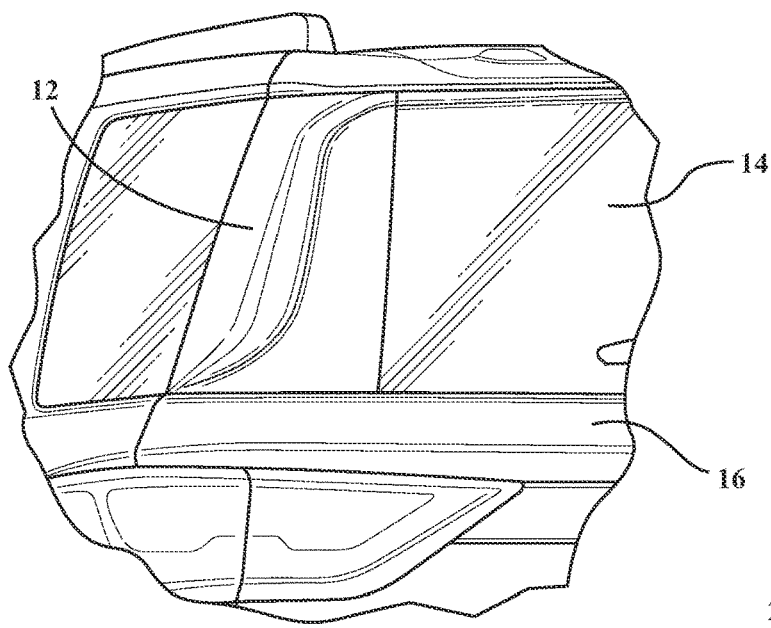
FIG. 4, is a perspective view of an airfoil incorporated with the liftgate, said airfoil in a stowed/closed position, in accordance with the present invention.

Referring to FIGS. 3-4 generally, the assembly 10 is similar to FIGS. 1-2, and indicates an angled deployed panel 12 in FIG. 3 and the panel 12 in the stowed position in FIG. 4. For example, the top of the deployed (or deploying) panel 12 is closer to the rear window 14 than the bottom of the panel 12. It is understood that the panel 12 can deploy any predetermined suitable position depending on the application. FIG. 3 depicts at least one hinge 17a and actuator 15 incorporated with an operable drive mechanism to rotate the panel 12 open/closed. By way of non-limiting example, the hinge is any suitable pivot pin arrangement.

The assembly 10 is operably coupled with the vehicle D-pillar and rotates generally out, e.g., by pivot pin/door hinge points and actuator. Alternatively, the assembly 10 is operably incorporated with the liftgate.

It is understood that the deployed panels 12 can rotate to a degree further or less than illustrated in FIGS. 1-4. The deployed panels 12 can rotate to angles more or less than illustrated in FIGS. 1-4. The deployed panels 12 can slide or otherwise move further rearward or less than illustrated in FIGS. 1-9.

Figure 5:
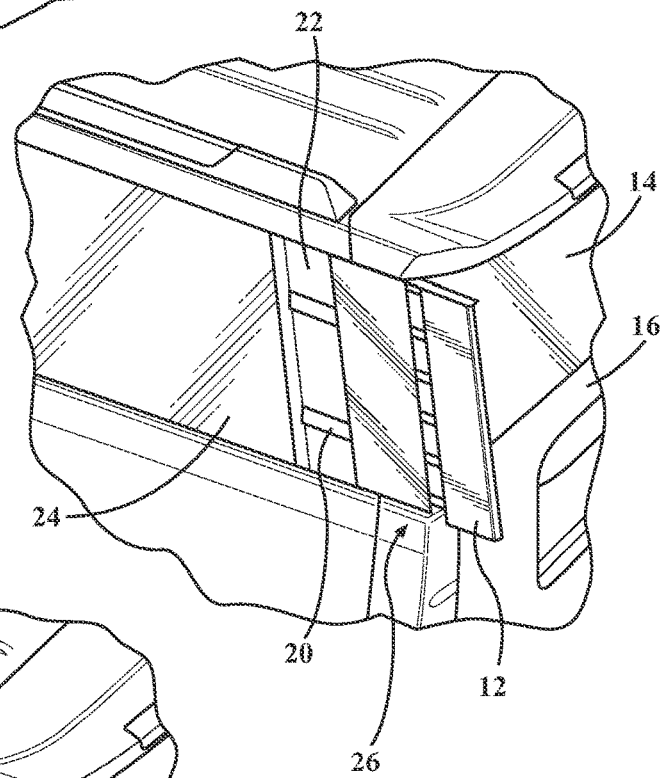
FIG. 5, is a perspective view of an airfoil deployed from a rear quarter window/D-pillar trim, said airfoil shown in a deployed/open position for improved aerodynamics, in accordance with the present invention.
Figure 6:
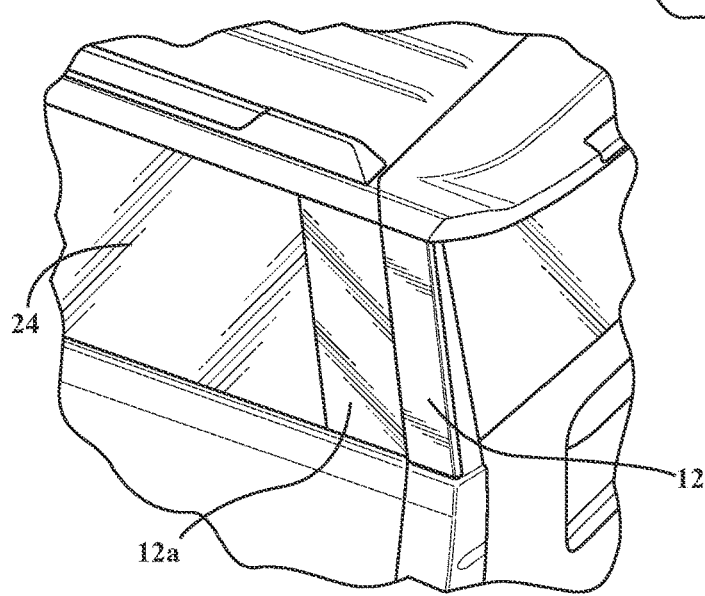
FIG. 6, is a perspective view of the airfoil of FIG. 5 incorporated with a liftgate, said airfoil in a stowed/closed position, in accordance with the present invention.

Referring more particularly to FIGS. 5-6, the assembly incorporates at least one slidable panel 12 including an operable sliding mechanism shown generally at 20 at slide the panel generally rearward of a rear side window 24 to the deployed position (FIG. 5) and generally forward to the stowed position (FIG. 6). Preferably, there are at least two slidable panels (12 and 12a); alternatively, there is only one or more than two. By way of non-limiting example, at least one rail or track 22 is incorporated to slide the panel 12 generally fore/aft. Most preferably, the assembly is operably incorporated with the rear quarter window/D-pillar trim shown generally at 26. FIGS. 5-6 illustrates that there is a pair of assemblies with panels 12,12a for improved aerodynamics. Exemplary rails/tracks/mechanisms for incorporation into the present invention are set forth in U.S. Pat. Nos. 8,322,073 B2 and 8,881,458 B2, which are incorporated herein in their entirety by reference as part of the specification.

The panel preferably slides out of the liftgate for structural, impact, etc requirements, not the D-piller, e.g., such as a direct slide on a track.

Figure 7:
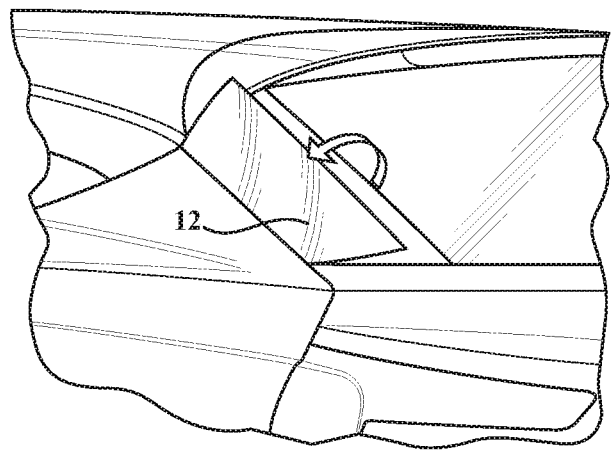
FIG. 7, is a perspective view of an airfoil in a deployed/open position for improved aerodynamics, in accordance with the present invention.
Figure 8:
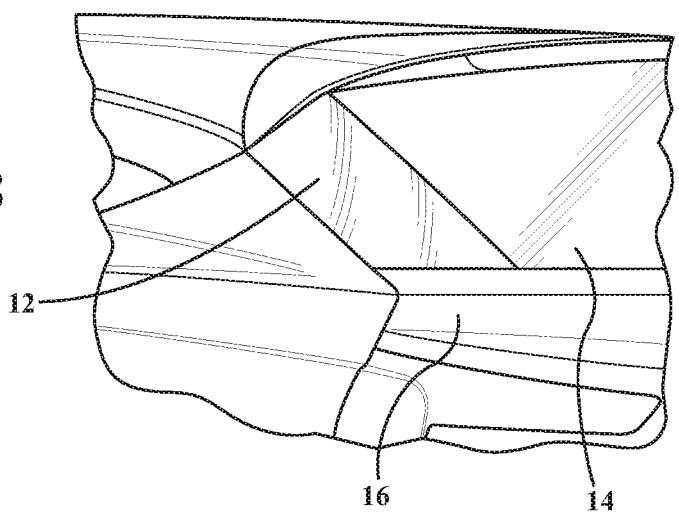
FIG. 8 is a perspective view of the airfoil of FIG. 7 in a stowed/closed position closed out on the glass, in accordance with the present invention.

Referring more particularly to FIGS. 7-8, there is depicted the assembly 10 incorporated on a vehicle and rotatable between a closed (FIG. 8) closed out on the rear window and a deployed position (FIG. 7), such as by at least one hinge 17 and actuator 15 as set forth previously and incorporated here.

Referring to FIGS. 1-8—it is understood that the panel 12 is deployed a predetermined desired amount to at least one deployed position.

Referring to FIGS. 1-4 and 7-8, by way of non-limiting example, the panel 12 is operably hinged to the liftgate, rear quarter or D-pillar.

Referring to FIGS. 1-8 and 11-13, the panel 12 extends an operable predetermined amount depending on the application for improved aerodynamics, e.g., to the rear edge of the spoiler, past the spoiler or less than the spoiler, or is incorporated on a vehicle not having a spoiler and extends an operable amount).

Referring to FIGS. 1-8 and 11-13, the panel 12 can be winged out, multi-position, single deployed position, angled, generally parallel to the rear of the vehicle, ect.

Referring to FIGS. 1-8 and 11-13, the panel 12 is rotated, slides, pivots, or combinations thereof depending on the application.

Referring to FIGS. 1-8 and 11-13, preferably, the panels 12 are winged outward, most preferably, not parallel to the longitudinal side of the vehicle.

Referring to FIG. 9 generally, there is provided at least one active wheel spat assembly, shown generally at 100 with at least one panel 110. There can be a left assembly and a right assembly mechanism. An assembly 100 is operably mounted adjacent to each front tire of the vehicle. Alternatively, the right and left sides are operably linked (e.g., kinematic linkage, 4-bar linkage, etc). Exemplary linkages, mechanisms for operably use individually or in combination into the present invention are set forth in U.S. 2017/0120968, U.S. Pat. Nos. 9,950,754 B2, 9,956,998 B2, which are incorporated herein in their entirety by reference as part of the specification.

By way of non-limiting example, the panel 110 flips up/down or moves up/down generally parallel to the front wheel. An exemplary actuator for incorporation into the present invention is set forth in U.S. 2016/0230820, which is incorporated herein in its entirety by reference as part of the specification.

FIG. 10 depicts an active liftgate spoiler assembly shown generally at 200 including at least one panel 210 operably deployable to at least one deployed position from the static spoiler 212 and/or roof 214. Preferably, the panel 210 includes a slidable mechanism.

FIGS. 11-13 depict an active assembly shown generally at 300 with bi-fold panels 302,304 and a track 306. Any number of panels are contemplated without departure from the scope of the present invention. Further, the panels could be sliding panels. By way of non-limiting example, the at least two panels can include at least one panel that slides to a deployed position. The position, is by way of non-limiting example, adjacent to a tailgate 308 and vehicle panel 310.

Referring to FIGS. 1-13 generally, the actuator incorporated with any embodiment is typically sealed, and, preferably, has communication capability with the vehicle. The actuator and the vehicle also communicate to deploy and retract the deployable panels based upon predetermined conditions such as vehicle speed, wind direction, e.g., average wind direction is unfavorably about 5° yaw, etc. e.g., when the vehicle reaches a predetermined speed, e.g., about 30-40 mph, the deployable panel 22 deployes to the deployed position until the vehicle drops back down to below the predetermined speed or other predetermined conditions for continued deployment are no longer met. Preferably, electronics sense current spike for override, which allows the clutch to disengage the drive system (e.g., object strike).

The panels 12,110,210,301/304 are any suitable material depending on the application. By way of non-limiting example a composite plastic, aluminum, glass, clear/transparent, painted carbon fiber, extruded rubber, or other suitable impact resistant material to withstand a predetermined load without departing from the scope of the invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An active panel assembly, for a vehicle, comprising
   at least one panel, where said at least one panel selectively deploys and retracts between at least one deployed position and a retracted position near the rear corners of said vehicle;
   at least one pivot pin hinge; and
   an actuator operably coupled to said at least one panel for deployment of said panel under predetermined conditions;
   wherein, when in said retracted position, an oppositely disposed non-hinged side of said at least one panel is against a side edge of a rear window of the vehicle.

2. The active panel assembly of claim 1, further comprising at least one drive mechanism operable to deploy said at least one panel between said stowed position and said at least one deployed position, wherein said deployed position is a winged position in an air flow for improved aerodynamics.

3. The active panel assembly of claim 1, wherein the assembly is operably incorporated with a liftgate of the vehicle.

4. The active panel assembly of claim 1, wherein the panel is operably hinged to deploy to an angle.

5. The active panel assembly of claim 1, wherein the assembly provides an active D-pillar trim of the vehicle.

6. The active panel assembly of claim 1, wherein the panel translates generally rearward to the at least one deployed position.

7. The active panel assembly of claim 1, wherein the assembly is further comprising a drive track system for sliding said at least one panel back/forward.

8. The active panel assembly of claim 1, wherein said predetermined conditions are vehicle speed or wind direction.

9. An active panel assembly for a vehicle, comprising
   at least one panel, where said at least one panel selectively deploys and retracts between at least one deployed position and a retracted position, wherein, in the retracted position, an oppositely disposed non-hinged side of said at least one panel is against a side edge of a rear window of the vehicle;
   at least one pivot pin hinge; and
   an actuator operably coupled to said at least one panel for deployment of said panel under predetermined conditions.

10. The active panel assembly of claim 9, wherein the assembly incorporates a track system adapted for sliding/translating said at least one panel fore/aft at the D-pillar of the vehicle.

11. An active panel assembly for a vehicle, comprising
    at least one panel, where said at least one panel selectively deploys and retracts between at least one deployed position and a retracted position wherein, in the retracted position, said at least one panel is against a side edge of a rear window of the vehicle; and
    at least one drive system operably coupled to said at least one panel for automatic deployment of said at least one panel under predetermined conditions, said predetermined conditions including vehicle speed or wind direction.

\* \* \* \* \*